(12) United States Patent
Kaneko (10) Patent No.: US 12,447,817 B2
(45) Date of Patent: Oct. 21, 2025

(54) VEHICLE LID DEVICE (71) Applicant: TOYODA GOSEI CO., LTD., Kiyosu (JP)

(72) Inventor: Kenichiro Kaneko, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 383 days.

(21) Appl. No.: 18/319,623

(22) Filed: May 18, 2023

(65) Prior Publication Data

US 2023/0382217 A1 Nov. 30, 2023

(30) Foreign Application Priority Data

May 26, 2022 (JP) ................................ 2022-086462

(51) Int. Cl.
*B60K 15/00* (2006.01)
*B60K 15/05* (2006.01)
(Continued)

(52) U.S. Cl.
CPC .............. *B60K 15/05* (2013.01); *E05D 15/20* (2013.01); *B60K 2015/0523* (2013.01);
(Continued)

(58) Field of Classification Search
CPC ............ B60K 15/05; B60K 2015/0523; E05D 15/20; E05F 15/665; E05Y 2201/684;
(Continued)

(56) References Cited

U.S. PATENT DOCUMENTS 11,214,141 B2 * 1/2022 Yagura .................... B60K 15/05
12,128,757 B2 * 10/2024 Kaneko .................... B60L 53/16
(Continued)

FOREIGN PATENT DOCUMENTS

CN 111605420 A 9/2020
JP 2012-076606 A 4/2012

OTHER PUBLICATIONS

Office Action dated Apr. 1, 2025 issued in the corresponding Japanese Patent Application No. 2022-086462 (and English translation).

*Primary Examiner* — Steven O Douglas
(74) *Attorney, Agent, or Firm* — Posz Law Group, PLC (57) ABSTRACT

This vehicle lid device includes: a box provided on a vehicle-body deep side and having an opening for exposing a storage space to a vehicle-body outside; a lid to open/close between opening-closed/opened positions; and an open/close mechanism to open/close the lid between the closed/opened positions. The open/close mechanism includes a rotary gear rotatable about a rotation axis extending along a vehicle-body back surface on the vehicle-body deep side, a slide member provided on the vehicle-body deep side, meshed with the rotary gear, and slidable along the vehicle-body back surface through rotation of the rotary gear, a first guide mechanism to move the lid in a vehicle-body front-back direction relative to the box by the slide member sliding in a first region section, and a second guide mechanism to move the lid along the vehicle-body back surface relative to the box by the slide member sliding in a second region section.

7 Claims, 6 Drawing Sheets (51) Int. Cl.
*E05D 15/20* (2006.01)
*E05F 15/665* (2015.01)

(52) U.S. Cl.
CPC ....... *E05F 15/665* (2015.01); *E05Y 2201/684* (2013.01); *E05Y 2201/708* (2013.01); *E05Y 2201/716* (2013.01); *E05Y 2201/722* (2013.01); *E05Y 2900/534* (2013.01)

(58) Field of Classification Search
CPC ......... E05Y 2201/708; E05Y 2201/716; E05Y 2201/722; E05Y 2900/534
See application file for complete search history.

(56) References Cited

U.S. PATENT DOCUMENTS

2016/0375762 A1* 12/2016 Lee ................... B60K 15/05
296/97.22
2023/0087162 A1* 3/2023 Kaneko ............... B60L 53/16
137/487

* cited by examiner

VEHICLE LID DEVICE

TECHNICAL FIELD

The present invention relates to a vehicle lid device.

BACKGROUND ART

Conventionally, there has been known a vehicle lid device mounted to a vehicle (for example, JP2012-76606(A)). The vehicle lid device is a device that opens/closes, by a lid, an opening of a box storing a supply port for supplying energy to a vehicle. The box is located on a vehicle-body deep side. The opening of the box communicates with the vehicle-body outside through a vehicle-body opening, and allows the supply port to be exposed to the vehicle-body outside. The lid is opened/closed between a closed position where the opening is closed and an opened position where the opening is opened.

One example of a structure for opening/closing the lid is a so-called dive-type structure in which, at a time of opening the lid from the closed position to the opened position, the lid is moved from the closed position to the vehicle-body deep side and then the lid is moved along a vehicle-body back surface. As a structure of the dive type, there is a structure in which opening/closing operation of the lid is performed using a wire-type worm gear (see, for example, Porsche Taycan EV).

In the above wire-type worm gear structure, a rotational force of a motor is transferred to the lid via the worm gear. A worm gear shaft extends downward from a motive power bearing of the motor. When a rotational force for opening the lid is transferred to the lid, the lid is drawn back to the vehicle-body deep side relative to the opening and then retreats upward along the vehicle-body back surface. On the other hand, when a rotational force for closing the lid is transferred to the lid, the lid moves downward along the vehicle-body back surface and then comes out to a vehicle-body front side so as to close the opening.

SUMMARY OF INVENTION

Technical Problem

However, in the above wire-type worm gear structure, while the lid moves upward/downward, the worm gear shaft also moves upward/downward. Specifically, when the lid retreats upward, the worm gear shaft retreats downward in a direction opposite to the lid with respect to the opening. On the other hand, when the lid returns downward, the worm gear shaft moves upward. Therefore, for performing opening/closing operation of the lid, operation stroke of the worm gear shaft needs to be ensured to be long in a direction opposite to the lid movement direction in the box, so that the device dimensions are enlarged.

The present invention has been made in view of the above circumstances, and an object of the present invention is to provide a vehicle lid device that enables size reduction of a mechanism for opening/closing a lid.

Solution to Problem

One aspect of the present invention is a vehicle lid device including: a box provided on a vehicle-body deep side and having an opening that allows a storage space to be exposed to a vehicle-body outside; a lid configured to open/close between a closed position where the opening is closed and an opened position where the opening is opened; and an open/close mechanism configured to cause the lid to open/close between the closed position and the opened position by moving the lid relative to the box. The open/close mechanism includes a rotary gear configured to rotate about a rotation axis extending along a vehicle-body back surface on the vehicle-body deep side, a slide member provided on the vehicle-body deep side, meshed with the rotary gear, and configured to slide along the vehicle-body back surface through rotation of the rotary gear, a first guide mechanism configured to move the lid in a vehicle-body front-back direction relative to the box by the slide member sliding in a first region section, and a second guide mechanism configured to move the lid in a direction along the vehicle-body back surface relative to the box by the slide member sliding in a second region section contiguous to the first region section.

This configuration enables size reduction of a mechanism for opening/closing a lid.

DESCRIPTION OF EMBODIMENTS

Hereinafter, with reference to FIG. 1 to FIG. 10, specific embodiments of a vehicle lid device according to the present invention will be described.

A vehicle lid device 1 of one embodiment is a device that opens/closes a lid for opening/closing a vehicle-body opening provided to a vehicle. The vehicle lid device 1 is mounted to a vehicle such as a gasoline vehicle, a diesel vehicle, an electric vehicle, or a hybrid vehicle.

Figure 1:
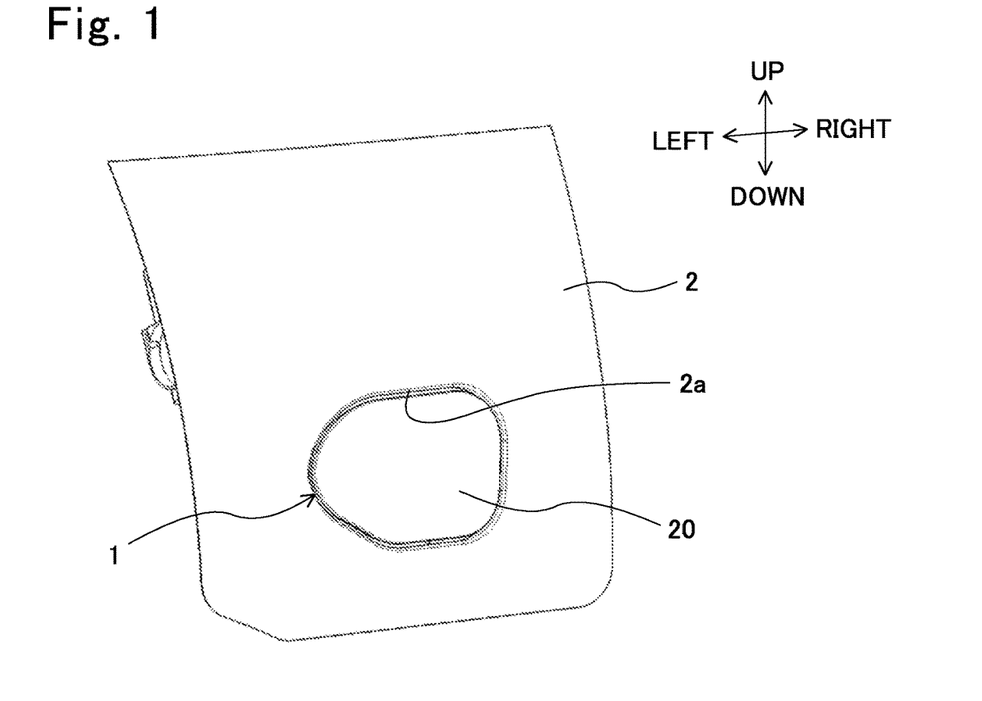
FIG. 1 is a perspective view of a vehicle lid device according to one embodiment of the present invention at a lid closed position.
Figure 2:
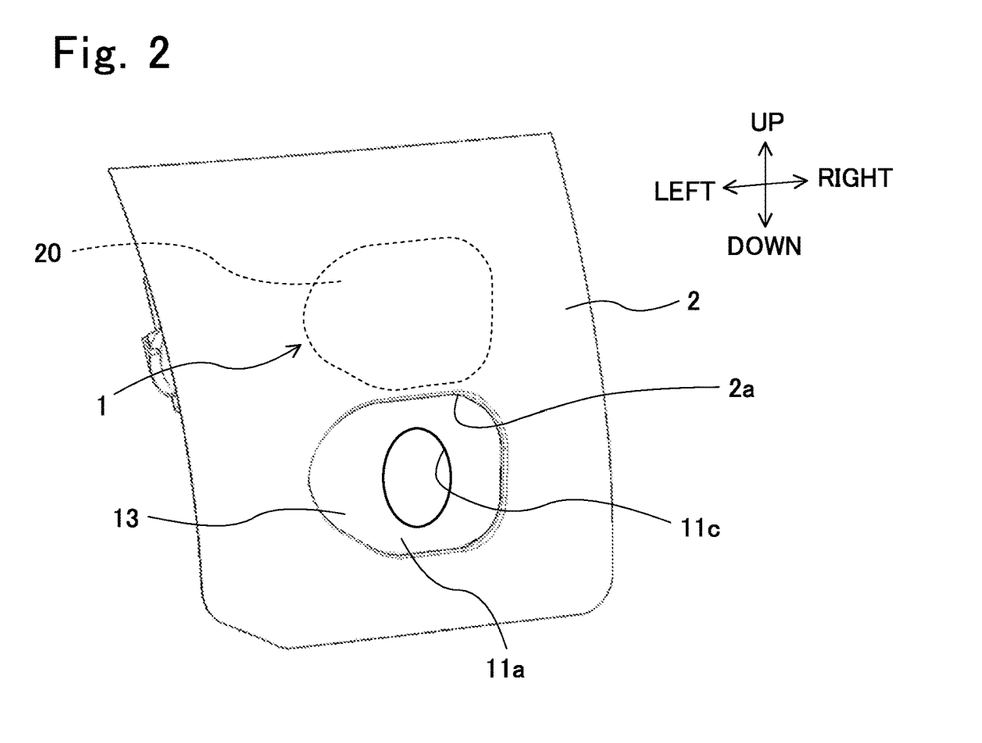
FIG. 2 is a perspective view of the vehicle lid device of the present embodiment at a lid opened position.

As shown in FIG. 1 and FIG. 2, the vehicle has a vehicle-body surface portion 2 such as a vehicle-body left/right surface, a vehicle-body forward surface, or a vehicle-body rearward surface. The vehicle-body surface portion 2 may include an outer panel, a vehicle door panel, a hood, or the like of a vehicle body. The vehicle-body surface portion 2 has a vehicle-body opening 2a. The vehicle-body opening 2a is a hole penetrating the vehicle-body surface portion 2 in a front-back direction which is an inner-outer direction, and is provided for accessing a supply port 3 for supplying energy to the vehicle or a door handle for opening a vehicle door. Hereinafter, in the present embodiment, the vehicle-body opening 2a is an opening for accessing the supply port 3.

The supply port 3 is a fuel port for refueling or a charge port for battery charging. The supply port 3 is provided so as to be exposed to the vehicle-body outside via the vehicle-body opening 2a in a lid opened state. The supply port 3 is provided at an end of a fuel supply pipe or an electric wire. Another end of the fuel supply pipe or the electric wire is connected to a fuel tank, a battery, or the like provided on a vehicle-body deep side (i.e., vehicle-body inner side). A refueling gun, a charging gun, or the like for supplying energy is connectable to the supply port 3 in a cap opened state. For a purpose such as protection from dust and water, the supply port 3 may be covered by a cap that is openable/closable by being manually operated by an operator.

Figure 3:
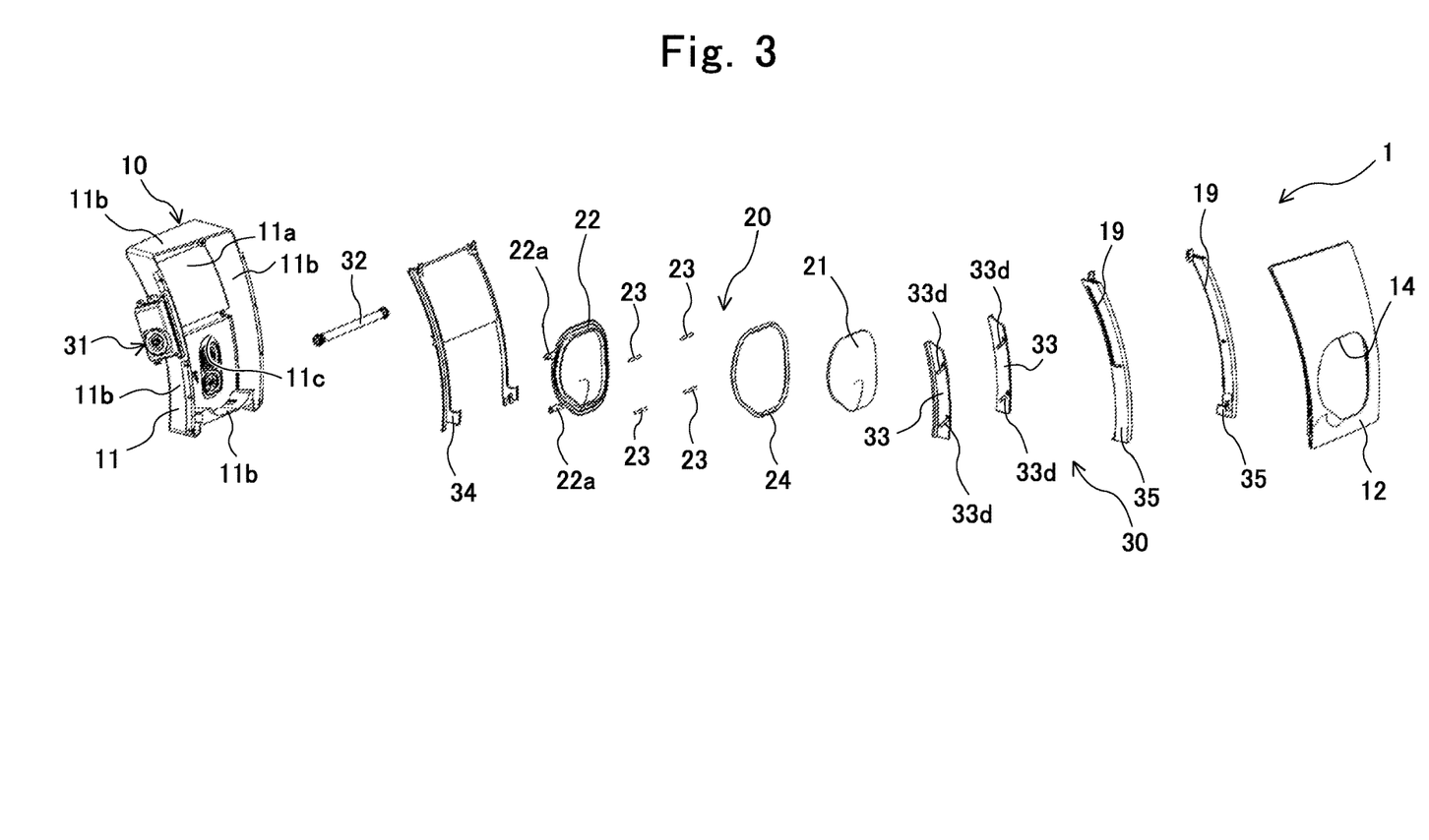
FIG. 3 is an exploded perspective view of the vehicle lid device of the present embodiment.
Figure 4:
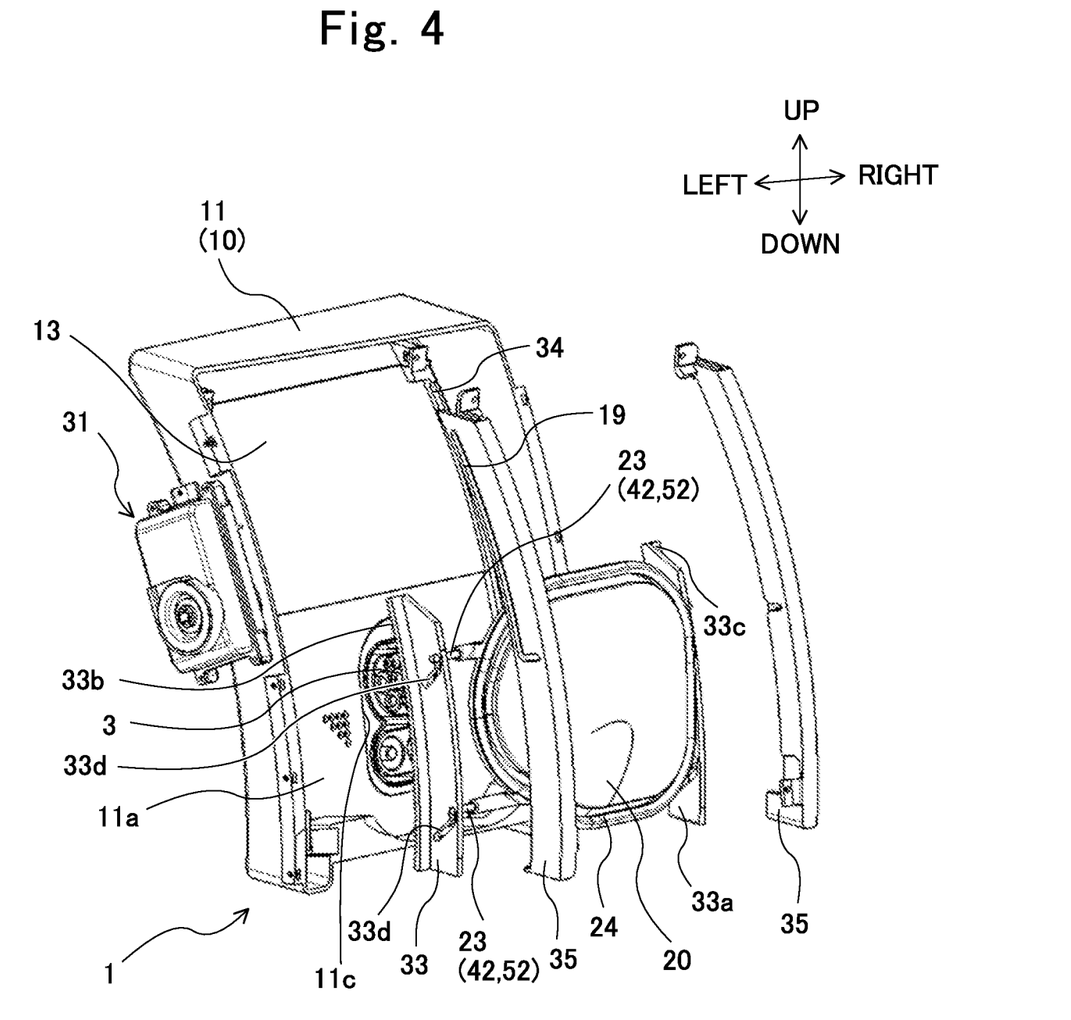
FIG. 4 is an exploded perspective view of an open/close mechanism provided to the vehicle lid device of the present embodiment.
Figure 5:
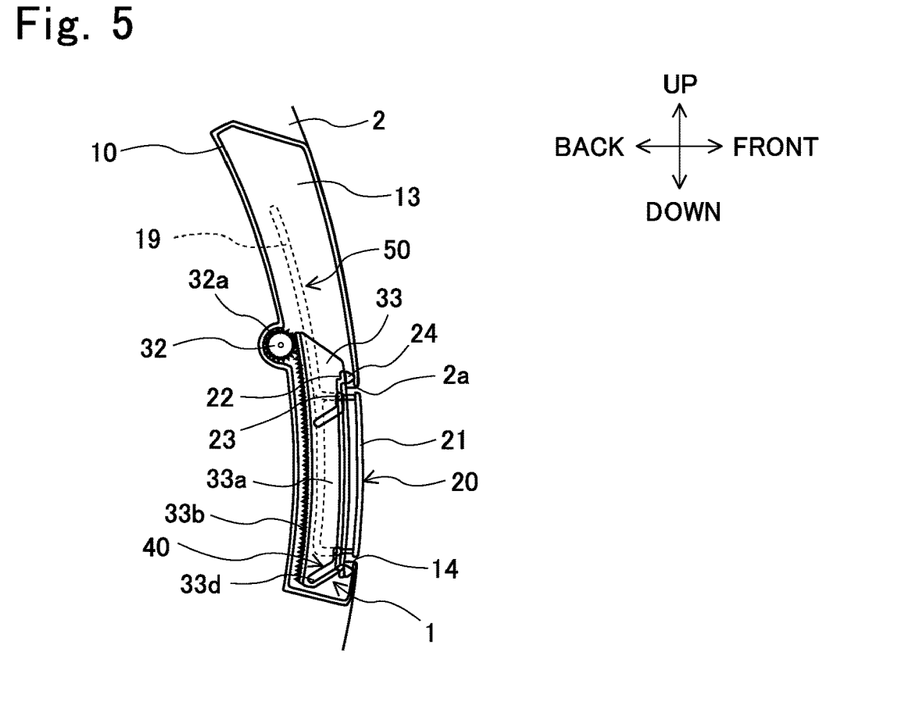
FIG. 5 shows a state of the open/close mechanism provided to the vehicle lid device of the present embodiment at the lid closed position.
Figure 6:
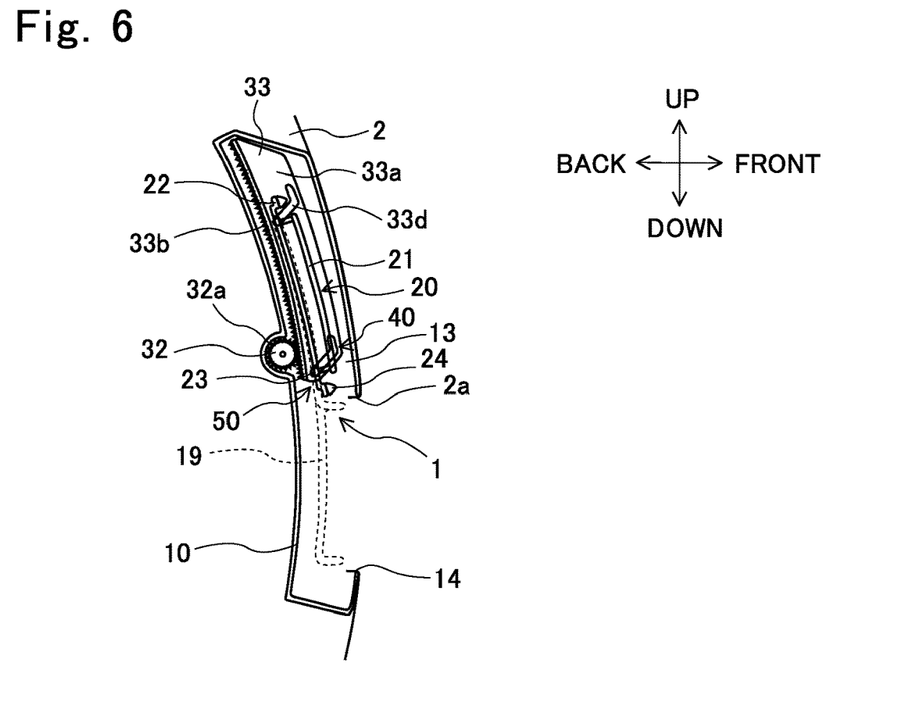
FIG. 6 shows a state of the open/close mechanism provided to the vehicle lid device of the present embodiment at the lid opened position.

As shown in FIG. 3 and FIG. 4, the vehicle lid device 1 includes a box 10, a lid 20, and an open/close mechanism 30. Hereinafter, directions (e.g., left/right) and arrangements are shown with reference to a state as seen from the front surface side of the lid 20. The vehicle lid device 1 is a so-called dive-type lid device in which, at a time of opening the lid 20 from a closed position to an opened position, the lid 20 is pushed into the vehicle-body deep side relative to the vehicle-body surface portion 2 so that the lid 20 is stored in a storage space of the box 10 at an opened position of the lid 20.

The box 10 is a box body storing the supply port 3. The box 10 is provided on the vehicle-body deep side of the vehicle-body surface portion 2 so as to be fitted to the vehicle-body opening 2a. The box 10 has a box body portion 11, a cover portion 12, a storage space 13, and an opening 14. The box 10 is attached to the vehicle-body surface portion 2 such that the opening 14 faces in the horizontal direction or slightly obliquely upward from the horizontal direction, for example.

The box body portion 11 is formed by a bottom wall 11a and a peripheral wall 11b. The bottom wall 11a is a bottom wall part extending in a plate shape. The bottom wall 11a is formed in a quadrangular shape, for example. The bottom wall 11a is provided along the back surface of the vehicle-body surface portion 2. The peripheral wall 11b is a side wall part erected from the periphery of the bottom wall 11a. The peripheral wall 11b is provided so as to surround the bottom wall 11a. The peripheral wall 11b has four surfaces, for example.

The cover portion 12 is a part covering an opening of the box body portion 11 on the side opposed to the bottom wall 11a. The cover portion 12 is a wall part extending in a plate shape. The cover portion 12 is formed in a quadrangular shape, for example. The cover portion 12 is attached to the box body portion 11, in a state of contacting with a vehicle-body front-side end of the peripheral wall 11b, by screw fastening or fitting fixation. The box body portion 11 and the cover portion 12 store or fix components that the open/close mechanism 30 has.

The storage space 13 is a space surrounded by the bottom wall 11a and the peripheral wall 11b and further by the cover portion 12. The storage space 13 stores the supply port 3. The storage space 13 is formed correspondingly to the size of the lid 20. Specifically, the storage space 13 is formed such that the left-right width thereof is greater than the left-right width of the lid 20 and the up-down width thereof is about two times the up-down width of the lid 20.

The bottom wall 11a has a communication hole 11c. The communication hole 11c is a passage through which the storage space 13 and the vehicle-body deep side of the bottom wall 11a communicate with each other, and is a through hole for leading the fuel supply pipe or the electric wire and storing the supply port 3 in the storage space 13. The communication hole 11c is provided at a center lower part of the bottom wall 11a.

The opening 14 is an opening allowed to be exposed to the vehicle-body outside. The opening 14 is provided at a lower part of aside (specifically, cover portion 12), of the box 10, opposed to the bottom wall 11a across the storage space 13. The opening 14 is provided so as to communicate with the vehicle-body opening 2a. That is, the box 10 is positioned at the vehicle-body surface portion 2 such that the opening 14 communicates with the vehicle-body opening 2a. The opening 14 allows the storage space 13 to be exposed to the vehicle-body outside via the vehicle-body opening 2a.

The opening 14 is opened/closed by the lid 20. The opening 14 is closed when the lid 20 is at the closed position, and is opened when the lid 20 is not at the closed position. When the opening 14 is opened, the opening 14 exposes the supply port 3 in the storage space 13 to the vehicle-body outside. The supply port 3 in a state of being stored in the storage space 13 is exposed to the vehicle-body outside through the opening 14 and the vehicle-body opening 2a, at the opened position of the lid 20.

The lid 20 is a lid member for covering the opening 14 of the box 10 and further the vehicle-body opening 2a. The lid 20 is openable/closable between the closed position (specifically, fully closed position) where the opening 14 is closed and the opened position (specifically, fully opened position) where the opening 14 is opened. The lid 20 is supported so as to be movable relative to the box 10. The lid 20 is stored in the storage space 13 of the box 10, at the opened position.

The lid 20 is formed in a plate shape. The lid 20 is formed in a size and a shape (e.g., quadrangle or circle) corresponding to the opening 14. At the closed position of the lid 20, the lid 20 closes the opening 14 so as to be flush with a peripheral portion around the opening 14, of the box body portion 11, and the vehicle-body surface portion 2. The surface of the lid 20 may be curved correspondingly to the surface shape of the vehicle-body surface portion 2.

The lid 20 includes a lid body portion 21, a lid frame portion 22, and support pins 23. The lid body portion 21 is a plate-shaped part forming a plate surface for closing the opening 14. The lid frame portion 22 is an annular frame portion forming the outer periphery of the lid 20. The lid body portion 21 and the lid frame portion 22 are integrated with each other by screw fastening or fitting fixation. At the closed position of the lid 20, the lid 20 is located so that the lid body portion 21 is flush with the vehicle-body surface portion 2.

The lid frame portion 22 has support portions 22a. Each support portion 22a is a hole part into which one end of each support pin 23 is inserted. The support pin 23 is a cylindrical member extending in the left-right direction. One end of the support pin 23 is inserted into the support portion 22a. The support portions 22a and the support pins 23 are provided at two locations on each of the upper and lower sides, at the left and the right of the lid frame portion 22 (four locations in total), for example. Each support portion 22a is provided at a cylindrical portion projecting in the left-right direction from the body of the lid frame portion 22. Another end of each support pin 23 is movably supported by a slide member 33 (described later) of the open/close mechanism 30. The lid 20 is movable relative to the slide member 33.

An annular gasket 24 is attached to the lid frame portion 22. The gasket 24 is a member for suppressing, for example, noise caused by direct contact between the lid 20 and the box 10, or the like, when the opening 14 is closed by the lid 20 being closed or in a state in which the lid 20 is at the closed position where the opening 14 is closed. The gasket 24 is formed by a material such as resin that is soft, flexible, and elastic, for example.

The gasket 24 is provided on the vehicle-body front side of the lid frame portion 22. At the closed position of the lid 20, the gasket 24 contacts with a back surface of a peripheral portion around the opening 14 in the cover portion 12 of the box 10. At the closed position of the lid 20, the outer periphery of the lid 20 and the above peripheral portion of the cover portion 12 of the box 10 are opposed to each other in the vehicle-body front-back direction, and the gasket 24 is interposed between the outer periphery of the lid 20 and the above peripheral portion of the cover portion 12 of the box 10. The gasket 24 may be attached to the cover portion 12, instead of the lid frame portion 22.

The open/close mechanism 30 is a mechanism for opening/closing the lid 20 between the closed position and the opened position by moving the lid 20 relative to the box 10. The open/close mechanism 30 is interposed between the box 10 and the lid 20. As shown in FIG. 3 to FIG. 10, the open/close mechanism 30 includes a motor 31, a gear shaft 32, the slide member 33, a first guide mechanism 40, and a second guide mechanism 50. The open/close mechanism 30 causes the lid 20 to open/close, using a drive force of the motor 31. The open/close mechanism 30 may cause the lid 20 to open/close through manual wire operation by an operator such as a vehicle occupant, in combination with or instead of the motor 31.

The motor 31 is a device that generates the drive force for opening/closing the lid 20. The motor 31 generates the drive force by an electric command from a controller, for example. The controller drives the motor 31 by an opening command or a closing command for the lid 20 from an operator or the like. A drive shaft of the motor 31 is connected to the gear shaft 32.

The gear shaft 32 is a shaft member that rotates about a rotation axis extending along the vehicle-body back surface of the vehicle-body surface portion 2. The gear shaft 32 rotates through driving of the motor 31. The gear shaft 32 is provided on the vehicle-body deep side (specifically, in the storage space 13) relative to the vehicle-body surface portion 2. The gear shaft 32 is provided so as to cross the storage space 13, in the vicinity of the up-down center of the storage space 13. The rotation axis of the gear shaft 32 extends in the left-right direction along the vehicle-body back surface, on the vehicle-body deep side. Rotary gears 32a are provided at both ends in the axial direction of the gear shaft 32. The rotary gears 32a are round gears.

The slide member 33 is a lid guide plate that slides in the up-down direction along the vehicle-body back surface, through rotation of the gear shaft 32. The slide member 33 slides between a lower-end position and an upper-end position. The slide direction of the slide member 33 may be a direction slightly inclined relative to the up-down direction, or may be a direction curved in an arc shape.

The slide member 33 is slidable in the up-down direction by a distance needed for opening/closing the lid 20 between the closed position and the opened position. The slide member 33 causes the lid 20 to open from the closed position to the opened position, by sliding to one side (specifically, upper side) in the up-down direction, and causes the lid 20 to close from the opened position to the closed position, by sliding to the other side (specifically, lower side) in the up-down direction.

The slide member 33 is provided on the vehicle-body deep side (specifically, in the storage space 13) relative to the vehicle-body surface portion 2. A pair of the slide members 33 are provided on the left side and the right side with the opening 14 located therebetween. The slide members 33 are meshed with the rotary gears 32a of the gear shaft 32. Each slide member 33 has a plate portion 33a, a gear portion 33b, and a flange portion 33c.

The plate portion 33a is a plate wall extending in the up-down direction and the front-back direction. The gear portion 33b is a rack gear meshed with the rotary gear 32a of the gear shaft 32. The rotary gear 32a and the gear portion 33b form gears of a rack-and-pinion type. The flange portion 33c is a plate wall integrated with a back-side end of the plate portion 33a and protruding in the left-right direction from the end of the plate portion 33a. The flange portion 33c extends in the up-down direction and the left-right direction. The gear portion 33b is provided on a back-side end surface of the flange portion 33c such that teeth protrude to the vehicle-body deep side.

The flange portion 33c is provided at a location sandwiched in the front-back direction between a guide forming member 34 and a guide forming member 35 described later. The flange portion 33c is sandwiched between the guide forming member 34 and the guide forming member 35 such that the gear portion 33b is meshed with the rotary gear 32a. The flange portion 33c is slidable in the up-down direction along the vehicle-body back surface through a guide hole formed by the guide forming member 34 and the guide forming member 35.

The guide forming member 34 and the guide forming member 35 are members that form the guide hole for slidably guiding the flange portion 33c. The guide forming member 34 and the guide forming member 35 are attached to the box 10 (specifically, box body portion 11) and integrated with the box 10.

As shown in FIG. 3, the guide forming member 34 has a frame portion formed along left and right peripheral portions of the storage space 13. The guide forming member 34 is attached to the vehicle-body front side of the bottom wall 11a of the box body portion 11. As shown in FIG. 3, the guide forming members 35 have plate portions formed along the left and right peripheral portions of the storage space 13. Each guide forming member 35 is attached to the vehicle-body front side of the guide forming member 34 or the vehicle-body front side of the bottom wall 11a of the box body portion 11, such that the guide hole that allows the flange portion 33c to slide therethrough is formed between the guide forming member 34 and the guide forming member 35.

The first guide mechanism 40 is a mechanism for moving the lid 20 in the vehicle-body front-back direction relative to the box 10 by each slide member 33 sliding in a first region section between the lower-end position and the upper-end position. The first region section is a section between the lower-end position and an up-down partway position (i.e., lower slide section), of the entire slide section where the slide member 33 slides when causing the lid 20 to open/close between the closed position and the opened position. The first guide mechanism 40 moves the lid 20 in the vehicle-body front-back direction between the closed position and a partway position on the vehicle-body deep side from the closed position.

The second guide mechanism 50 is a mechanism for moving the lid 20 in a direction along the vehicle-body back surface relative to the box 10 by each slide member 33 sliding in a second region section between the lower-end position and the upper-end position. The second region section is a section between the above up-down partway position and the upper-end position (i.e., upper slide section), of the above entire slide section for the slide member 33. The second region section is contiguous to the first region section. The second guide mechanism 50 moves the lid 20 in a direction along the vehicle-body back surface, i.e., the slide direction of the slide member 33, between the above partway position on the vehicle-body deep side and the opened position.

The first guide mechanism 40 and the second guide mechanism 50 are each formed by a shaft part and a hole groove engaged with each other, for moving the lid 20 relative to the box 10 through sliding of the slide member 33. The shaft part of the first guide mechanism 40 and the shaft part of the second guide mechanism 50 may be independent of each other or may be an identical shaft part shared by each other.

The first guide mechanism 40 includes an engagement restriction portion 41, a first support projection 42, and a first guide hole portion 43. The second guide mechanism 50 includes an integration portion 51, a second support projection 52, and a second guide hole portion 53.

The engagement restriction portion 41 is a part that engages the box 10 and the lid 20 with each other during sliding of the slide member 33 in the first region section, thereby restricting the lid 20 from moving in the direction along the vehicle-body back surface, i.e., the slide direction of the slide member 33, relative to the box 10. The engagement restriction portion 41 is formed by a part provided to the lid 20 and a part provided to the box 10. Specifically, the engagement restriction portion 41 is formed by the first support projection 42 and a periphery of a front-back-direction region portion 43*d* (described later) of the first guide hole portion 43.

The first support projection 42 is a projecting portion fixed to the lid 20 or the slide member 33. The first support projection 42 is movably supported by being inserted into the first guide hole portion 43. In the present embodiment, the first support projection 42 is provided to the lid 20. Specifically, the first support projection 42 is the above support pin 23.

The first guide hole portion 43 is a hole groove for guiding the first support projection 42 so that the lid 20 moves in the vehicle-body front-back direction relative to the box 10 during sliding of the slide member 33 in the first region section. In a case where the first support projection 42 is provided to the lid 20, the first guide hole portion 43 includes a hole groove provided to the slide member 33 and a hole groove provided to the box 10.

The first guide hole portion 43 includes an idle region portion 43*a*, a slope region portion 43*b*, a protrusion-shaped movement region portion 43*c*, and a front-back-direction region portion 43*d*. The idle region portion 43*a*, the slope region portion 43*b*, and the protrusion-shaped movement region portion 43*c* are provided to the slide member 33. The front-back-direction region portion 43*d* is provided to the box 10 (specifically, the guide forming members 34, 35 integrated with the box 10).

The idle region portion 43*a*, the slope region portion 43*b*, and the protrusion-shaped movement region portion 43*c* are provided such that the idle region portion 43*a*, the protrusion-shaped movement region portion 43*c*, and the slope region portion 43*b* are formed contiguously in this order in the slide member 33. The slide member 33 has one guide hole 33*d* (see FIG. 3, FIG. 4, FIG. 7 to FIG. 10) forming the idle region portion 43*a*, the slope region portion 43*b*, and the protrusion-shaped movement region portion 43*c*.

The idle region portion 43*a*, the slope region portion 43*b*, and the protrusion-shaped movement region portion 43*c* penetrate the plate portion 33*a* of the slide member 33 in the left-right direction, so as to be formed in a hole shape in the plate portion 33*a*. The idle region portion 43*a*, the slope region portion 43*b*, and the protrusion-shaped movement region portion 43*c* have such hole widths that allow insertion of the first support projection 42, and extend so that the first support projection 42 is relatively movable therein.

The idle region portion 43*a* is a region where the first support projection 42 is not moved in the vehicle-body front-back direction relative to the slide member 33 even when the slide member 33 slides in the direction along the vehicle-body back surface, near the closed position of the lid 20. The idle region portion 43*a* is formed in the plate portion 33*a* so as to extend in the slide direction of the slide member 33 so that, during sliding of the slide member 33, the first support projection 42 does not move in the vehicle-body front-back direction relative to the slide member 33, i.e., the lid 20 does not move in the vehicle-body front-back direction relative to the box 10. The length in the slide direction of the idle region portion 43*a* may be great or short, but is preferably short for the purpose of reducing the idle slide distance of the slide member 33. The idle region portion 43*a* is formed on the upper end side in the first guide hole portion 43. The upper end of the idle region portion 43*a* is closed.

The slope region portion 43*b* is a region where the first support projection 42 is moved in the vehicle-body front-back direction relative to the slide member 33 when the slide member 33 slides in the first region section. The slope region portion 43*b* is formed in the plate portion 33*a* so as to extend in a direction sloped relative to the slide direction of the slide member 33 so that, during sliding of the slide member 33 in the first region section, the first support projection 42 moves in the vehicle-body front-back direction relative to the slide member 33 and thus the lid 20 moves in the vehicle-body front-back direction relative to the box 10. The slope angle of the slope region portion 43*b* may be set at such an angle (e.g., 45°) that the first support projection 42 moves in the vehicle-body front-back direction efficiently through sliding of the slide member 33. The slope region portion 43*b* is formed on the lower end side in the first guide hole portion 43.

The slope region portion 43*b* is sloped from the vehicle-body front side to the vehicle-body deep side in a direction from the upper side to the lower side. Therefore, when the first support projection 42 moves in the slope region portion 43*b*, in a case of opening operation of the lid 20, the first support projection 42 moves to the vehicle-body deep side relative to the slide member 33 and thus the lid 20 moves to the vehicle-body deep side relative to the box 10, and in a case of closing operation of the lid 20, the first support projection 42 moves to the vehicle-body front side relative to the slide member 33 and thus the lid 20 moves to the vehicle-body front side relative to the box 10. The lower end and the vehicle-body deep-side end of the slope region portion 43*b* are closed.

The protrusion-shaped movement region portion 43c is a region where the first support projection 42 is moved to the vehicle-body front side relative to the slide member 33 when the lid 20 is opened from the closed position. The protrusion-shaped movement region portion 43c is formed in the plate portion 33a so as to extend in a direction sloped relative to the slide direction of the slide member 33 so that, during opening operation of the lid 20, the first support projection 42 moves to the vehicle-body front side relative to the slide member 33 and thus the lid 20 moves to the vehicle-body front side relative to the box 10.

The protrusion-shaped movement region portion 43c is formed so that, during opening operation of the lid 20 from the closed position, a compressive force is applied to the gasket 24 so as to press the gasket 24 to the peripheral portion around the opening 14 in the cover portion 12 of the box 10 and elastically deform the gasket 24, and during opening operation of the lid 20 from the closed position, the lid 20 protrudes to the vehicle-body outside from the vehicle-body front surface (i.e., vehicle-body surface portion 2). The compressive force and the protruding amount at the protrusion-shaped movement region portion 43c may be set at such values that, when the gasket 24 is frozen and fixed at the closed position of the lid 20, displacement occurs at the ice-adhesion interface between the gasket 24 and the ice.

The protrusion-shaped movement region portion 43c is formed at an up-down intermediate part in the first guide hole portion 43. That is, the protrusion-shaped movement region portion 43c is provided contiguously to the idle region portion 43a on the upper side and contiguously to the slope region portion 43b on the lower side. The protrusion-shaped movement region portion 43c is sloped or curved from the vehicle-body deep side to the vehicle-body front side in a direction from the upper side to the lower side. Therefore, when the first support projection 42 moves in the protrusion-shaped movement region portion 43c, in a case of opening operation of the lid 20, the first support projection 42 moves to the vehicle-body front side relative to the slide member 33 and thus the lid 20 moves to the vehicle-body front side relative to the box 10, and in a case of closing operation of the lid 20, the first support projection 42 moves to the vehicle-body deep side relative to the slide member 33 and thus the lid 20 moves to the vehicle-body deep side relative to the box 10.

The front-back-direction region portion 43d penetrates a left-right facing wall of the guide forming member 35 in the left-right direction or is formed between the guide forming members 34, 35 so as to open in the left-right direction, and is formed in a hole shape in the wall or the like. The front-back-direction region portion 43d has such a hole width that allows insertion of the first support projection 42. The front-back-direction region portion 43d extends so that the first support projection 42 is relatively movable therein.

The front-back-direction region portion 43d is a region where the first support projection 42 is moved in the vehicle-body front-back direction relative to the box 10 without being moved in the slide direction of the slide member 33 relative thereto when the slide member 33 slides in the first region section. The front-back-direction region portion 43d is formed in the box 10 so as to extend in the vehicle-body front-back direction so that, during sliding of the slide member 33 in the first region section, the first support projection 42 moves in the vehicle-body front-back direction without moving in the slide direction relative to the box 10 through movement in the slope region portion 43b and the protrusion-shaped movement region portion 43c.

The integration portion 51 is a part for moving the lid in the slide direction of the slide member 33, with the lid and the slide member 33 integrated, during sliding of the slide member 33 in the second region section. The integration portion 51 is formed by a part provided to the lid 20, a part provided to the slide member 33, and a part provided to the box 10. Specifically, the integration portion 51 is formed by the second support projection 52, a terminal part (i.e., lower end and vehicle-body deep-side end) of the slope region portion 43b of the slide member 33, and a periphery of a slide region portion 53a (described later) of the second guide hole portion 53.

The second support projection 52 is a projecting portion fixed to the box 10, the lid 20, or the slide member 33. The second support projection 52 is movably supported by being inserted into the second guide hole portion 53. In the present embodiment, the second support projection 52 is provided to the lid 20. Specifically, the second support projection 52 is the above support pin 23. That is, in the present embodiment, the first support projection 42 and the second support projection 52 are an identical shaft part, and specifically, is the support pin 23.

The second guide hole portion 53 is a hole groove for guiding the second support projection 52 so that the lid 20 moves in the slide direction of the slide member 33 relative to the box 10 during sliding of the slide member 33 in the second region section. In a case where the second support projection 52 is provided to the lid 20, the second guide hole portion 53 includes the hole groove provided to the box 10.

The second guide hole portion 53 includes the slide region portion 53a. The slide region portion 53a is provided to the box 10 (specifically, the guide forming members 34, 35 integrated with the box 10).

The slide region portion 53a penetrates the left-right facing wall of the guide forming member 35 in the left-right direction or is formed between the guide forming members 34, 35 so as to open in the left-right direction, and is formed in a hole shape in the wall or the like. The slide region portion 53a has such a hole width that allows insertion of the second support projection 52. The slide region portion 53a extends so that the second support projection 52 is relatively movable therein.

The slide region portion 53a is a region where the second support projection 52 is moved in the slide direction of the slide member 33 relative to the box 10 when the slide member 33 slides in the second region section. The slide region portion 53a is formed in the box 10 so as to extend in the slide direction of the slide member 33 so that, during sliding of the slide member 33 in the second region section, the second support projection 52 moves in the slide direction relative to the box 10. The slide region portion 53a is provided contiguously to the front-back-direction region portion 43d of the first guide hole portion 43 of the box 10. The box 10 has one guide hole 19 (see FIG. 3, FIG. 4, FIG. 7 to FIG. 10) forming the front-back-direction region portion 43d and the slide region portion 53a.

Next, operation of the vehicle lid device 1 will be described.

In the vehicle lid device 1, each support pin 23 (i.e., first support projection 42 and second support projection 52) provided to the lid 20 is movably supported by being inserted into the guide hole 33d of the slide member 33 and the guide hole 19 of the box 10 (specifically, the guide forming members 34, 35 integrated with the box 10). The vehicle lid device 1 changes the position of the support pin 23 in the guide hole 33d and the position of the support pin 23 in the guide hole 19 through slide movement of the slide member 33, thereby opening/closing the lid 20 between the closed position and the opened position.

Figure 7:
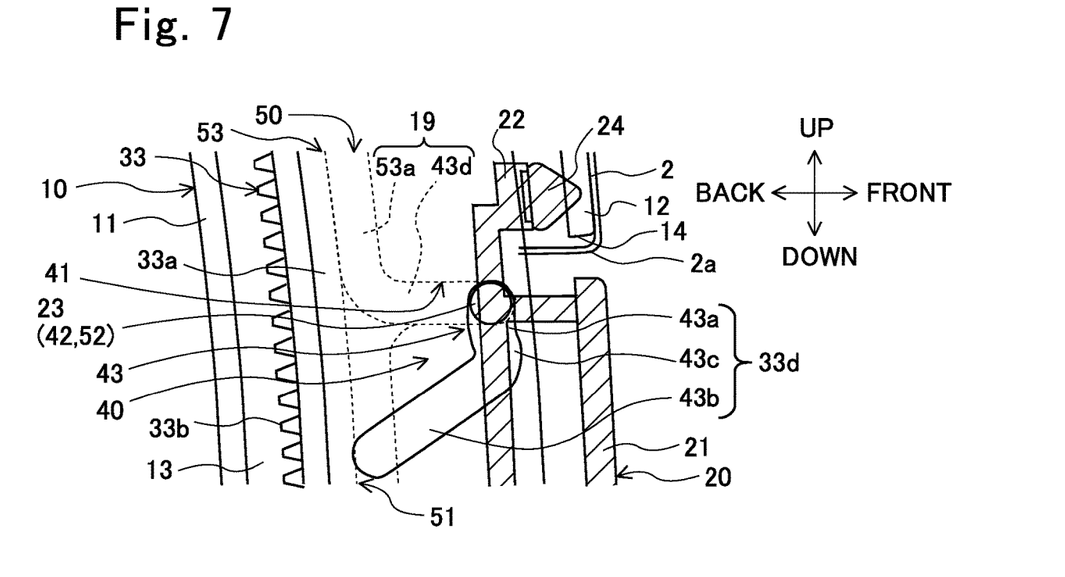
FIG. 7 shows the positional relationship among parts of the vehicle lid device of the present embodiment at the lid closed position.
Figure 8:
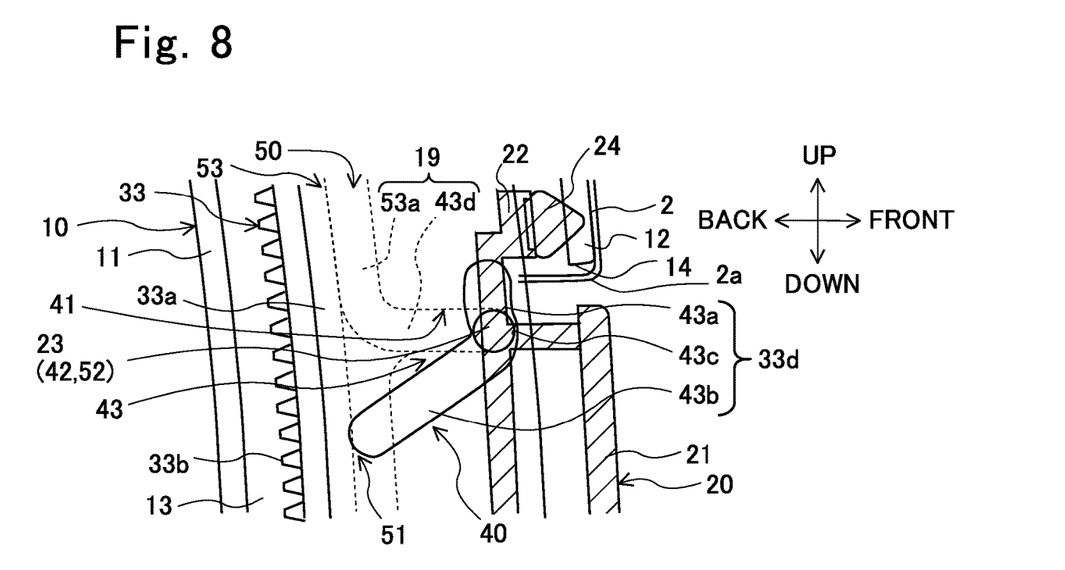
FIG. 8 shows the positional relationship among parts of the vehicle lid device of the present embodiment when a lid is pushed up to a vehicle-body front side.
Figure 9:
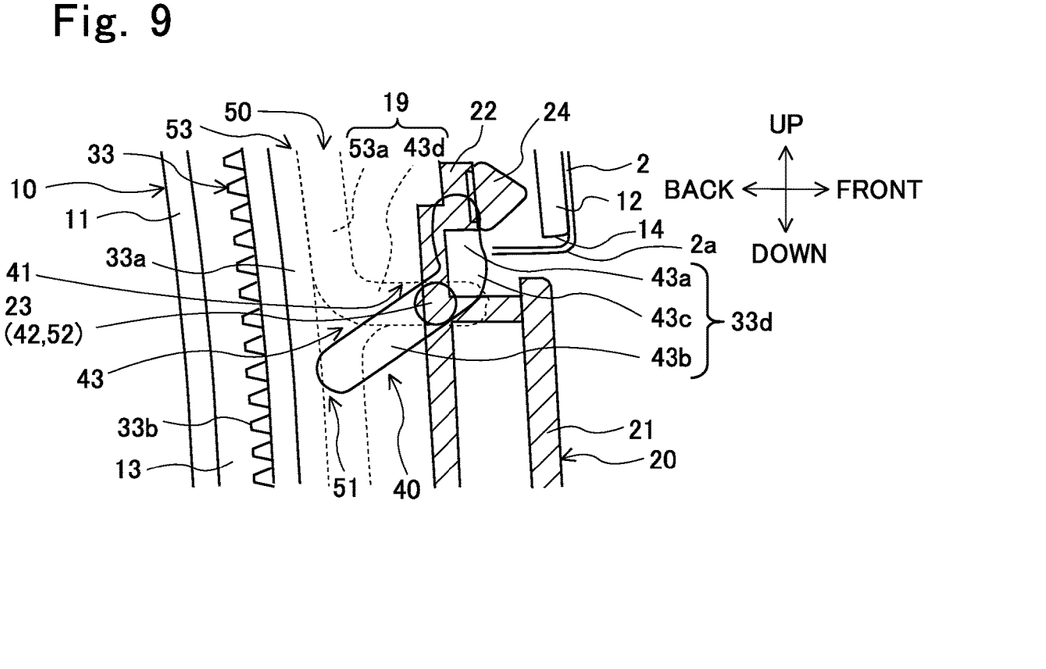
FIG. 9 shows the positional relationship among parts of the vehicle lid device of the present embodiment when the lid is drawn back to a vehicle-body deep side.

During traveling of the vehicle or the like, the lid 20 is at the closed position where the opening 14 of the box 10 is closed. In this case, the lid 20 is locked at the closed position by a lock member (not shown) or the like. At the closed position of the lid 20, the supply port 3 in the storage space 13 of the box 10 is not exposed to the vehicle-body outside via the opening 14 and the vehicle-body opening 2a, and therefore connection of a refueling gun or a charging gun to the supply port 3 is impossible. In addition, as shown in FIG. 7, at the closed position of the lid 20, the support pin 23 of the lid 20 is located at the upper end of the idle region portion 43a and the vehicle-body front-side end of the front-back-direction region portion 43d of the first guide hole portion 43, in the guide hole 19 of the box 10 and the guide hole 33d of the slide member 33.

In a case of desiring to perform refueling or battery charging of the vehicle in a state in which the lid 20 is at the closed position, an operator such as a vehicle driver or a vehicle user stops the vehicle and performs, on the vehicle, necessary work for opening the lid 20 to the opened position. This work includes a lock release operation of releasing the lock of the lid 20 at the closed position, and in accordance with the situation of the operator, for example, the operator having a smart key corresponding to the vehicle approaches the vehicle to cause the vehicle to perform matching through communication between the vehicle and a portable device; the operator performs an opening command by an application of a smartphone; the operator presses an open-switch button provided in the vehicle; or the operator pulls an open lever provided in the vehicle.

When the above work is performed, the lock of the lid 20 at the closed position is released and the motor 31 of the open/close mechanism 30 is driven by an opening command from the controller, so that the gear shaft 32 rotates in a direction (opening direction) of opening the lid 20 from the closed position. When the gear shaft 32 rotates in the opening direction, the slide member 33 meshed with the gear shaft 32 slides upward along the vehicle-body back surface from the lower-end position.

When the slide member 33 slides upward relative to the box 10 from the lower-end position, in the first region section, the support pin 23 moves relatively downward in the idle region portion 43a of the first guide hole portion 43. In this case, the support pin 23 engages with the periphery of the front-back-direction region portion 43d of the box 10 forming the engagement restriction portion 41. Therefore, while the lid 20 is allowed to move in the vehicle-body front-back direction relative to the box 10, the lid 20 is restricted from moving in the slide direction of the slide member 33. Also, in this case, the support pin 23 is not subjected to a pressing force in the vehicle-body front-back direction from the peripheral portion of the idle region portion 43a of the slide member 33. Therefore, the lid 20 does not move in the vehicle-body front-back direction relative to the box 10.

As the slide member 33 continues sliding upward, the support pin 23 reaches the protrusion-shaped movement region portion 43c of the first guide hole portion 43. In this case, the support pin 23 when moving in the protrusion-shaped movement region portion 43c is subjected to a pressing force toward the vehicle-body front side from the peripheral portion of the protrusion-shaped movement region portion 43c of the slide member 33, and thus moves from the vehicle-body deep side to the vehicle-body front side in the front-back-direction region portion 43d, so that the lid 20 moves to the vehicle-body front side relative to the box 10 so as to be pushed up (see FIG. 8). This movement of the lid 20 to the vehicle-body front side is performed until the support pin 23 reaches the protrusion end of the protrusion-shaped movement region portion 43c.

Then, when the support pin 23 has passed through the protrusion-shaped movement region portion 43c, movement of the lid 20 to the vehicle-body front side stops, and the support pin 23 next reaches the slope region portion 43b. In this case, the support pin 23 when moving in the slope region portion 43b is subjected to a pressing force toward the vehicle-body deep side from the peripheral portion of the slope region portion 43b of the slide member 33, and thus moves from the vehicle-body front side to the vehicle-body deep side in the front-back-direction region portion 43d, so that the lid 20 moves to the vehicle-body deep side relative to the box 10 (see FIG. 9). This movement of the lid 20 to the vehicle-body deep side is performed until the support pin 23 reaches the terminal part of the slope region portion 43b and the vehicle-body deep-side end of the front-back-direction region portion 43d and thus sliding of the slide member 33 in the first region section is finished.

Then, when the support pin 23 has reached the terminal part of the slope region portion 43b of the first guide hole portion 43 and the vehicle-body deep-side end of the front-back-direction region portion 43d, movement of the lid 20 to the vehicle-body deep side relative to the slide member 33 stops. Thereafter, when the slide member 33 continues sliding upward and has reached the second region section, the lid 20 moves integrally with the slide member 33 by the integration portion 51.

Figure 10:
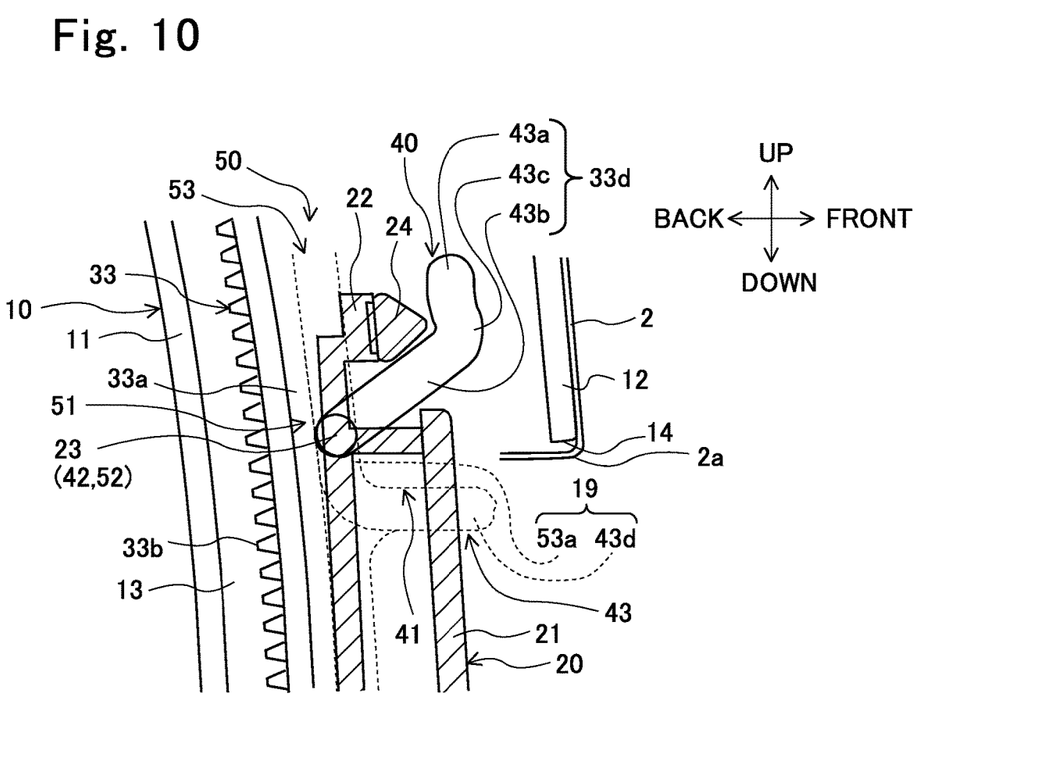
FIG. 10 shows the positional relationship among parts of the vehicle lid device of the present embodiment when the lid slides along a vehicle-body back surface.

That is, after the support pin 23 has reached the terminal part of the slope region portion 43b and the vehicle-body deep-side end of the front-back-direction region portion 43d, as the slide member 33 further continues sliding upward, the support pin 23 moves upward from the lower end in the slide region portion 53a of the second guide hole portion 53, with the lid 20 and the slide member 33 integrated (see FIG. 10). That is, since engagement between the support pin 23 and the periphery of the front-back-direction region portion 43d is released, the lid 20 is allowed to move in the slide direction of the slide member 33 relative to the box 10. In addition, since the support pin 23 is not subjected to a pressing force in the vehicle-body front-back direction from the slide member 33, the lid 20 moves in the slide direction of the slide member 33 without moving in the vehicle-body front-back direction relative to the box 10, in the storage space 13.

The above movement of the lid 20 in the slide direction is performed until upward sliding of the slide member 33 stops by stop of driving of the motor 31 or the support pin 23 reaches the upper end of the slide region portion 53a and thus sliding of the slide member 33 in the second region section is finished. Then, when sliding of the slide member 33 in the second region section is finished, the lid 20 reaches the opened position.

Next, in a case of desiring to return the lid 20 to the closed position after refueling or battery charging of the vehicle is completed at the opened position of the lid 20, the operator performs, on the vehicle, necessary work for closing the lid 20 to the closed position. This work includes a locking operation of locking the lid 20 at the closed position, and in accordance with the situation of the operator, for example, the operator having the smart key corresponding to the vehicle moves away from the vehicle to cause the vehicle to perform matching through communication between the vehicle and the portable device; the operator performs a closing command by the application of the smartphone; or the operator presses a close-switch button provided in the vehicle or around the lid 20.

When the above work is performed, at the opened position of the lid 20, the motor 31 of the open/close mechanism 30 is driven by a closing command from the controller, so that the gear shaft 32 rotates in a direction (closing direction) of closing the lid 20 from the opened position. When the gear shaft 32 rotates in the closing direction, the slide member 33 meshed with the gear shaft 32 slides downward along the vehicle-body back surface from the upper-end position.

When the slide member 33 slides downward relative to the box 10 from the upper-end position, the support pin 23 moves through a route opposite to that in the above opening operation of the lid 20. Specifically, when the slide member 33 slides downward, in the second region section, the support pin 23 moves downward in the slide region portion 53a of the second guide hole portion 53. In this case, the support pin 23 when moving in the slide region portion 53a is not subjected to a pressing force in the vehicle-body front-back direction from the slide member 33. Therefore, the lid 20 moves in the slide direction of the slide member 33 without moving in the vehicle-body front-back direction relative to the box 10, in the storage space 13 (see FIG. 10).

Then, when the support pin 23 has reached the lower end of the slide region portion 53a of the second guide hole portion 53, movement of the lid 20 in the slide direction relative to the box 10 stops, and thereafter, when the slide member 33 slides downward, the support pin 23 is allowed to move in the front-back-direction region portion 43d of the first guide hole portion 43, so that integration of the lid 20 and the slide member 33 by the integration portion 51 is released.

After the support pin 23 has reached the lower end of the slide region portion 53a, when the slide member 33 further continues sliding downward and has reached the first region section, the support pin 23 moves in the slope region portion 43b and the front-back-direction region portion 43d of the first guide hole portion 43, in a state in which integration of the lid 20 and the slide member 33 is released. In this case, the support pin 23 engages with the periphery of the front-back-direction region portion 43d. Therefore, the lid 20 is restricted from moving in the slide direction of the slide member 33 relative to the box 10. Also, in this case, the support pin 23 is subjected to a pressing force toward the vehicle-body front side from the peripheral portion of the slope region portion 43b of the slide member 33, and thus moves from the vehicle-body deep side to the vehicle-body front side in the front-back-direction region portion 43d, so that the lid 20 moves to the vehicle-body front side relative to the box 10 (see FIG. 9). This movement of the lid 20 to the vehicle-body front side is performed until the support pin 23 reaches the protrusion end of the protrusion-shaped movement region portion 43c.

When the support pin 23 has passed through the protrusion-shaped movement region portion 43c, the lid 20 once moves to the topmost end on the vehicle-body front side (see FIG. 8) and then moves back to the vehicle-body deep side. Then, when the support pin 23 has reached the idle region portion 43a, movement of the lid 20 relative to the box 10 stops. Thus, the lid 20 reaches the closed position.

The support pin 23 when moving in the idle region portion 43a is not subjected to pressing forces in the vehicle-body front-back direction and the vehicle body up-down direction from the peripheral portion of the idle region portion 43a of the slide member 33, and therefore the lid 20 does not move relative to the box 10. Then, when downward sliding of the slide member 33 stops by stop of driving of the motor 31 or the support pin 23 has reached the upper end of the idle region portion 43a (see FIG. 7), sliding of the slide member 33 in the first region section is finished.

As described above, in the vehicle lid device 1, the gear shaft 32 to be rotated using the motor 31, and the slide member 33, are meshed with each other using gears, and the gear shaft 32 is rotated through driving of the motor 31, to cause the slide member 33 to slide in the direction along the vehicle-body back surface, thereby opening/closing the lid 20 between the closed position and the opened position.

Specifically, when the slide member 33 slides upward along the vehicle-body back surface through rotation of the gear shaft 32 in the opening direction, the lid 20 performs opening operation of drawing back from the closed position to the vehicle-body deep side and then moving upward along the vehicle-body back surface, and when the slide member 33 slides downward along the vehicle-body back surface through rotation of the gear shaft 32 in the closing direction, the lid 20 performs closing operation of moving downward along the vehicle-body back surface from the opened position and then coming out to the vehicle-body front side.

In this configuration, for performing opening/closing operation of the lid 20, stroke of the slide member 33 need not be ensured to be long in a direction opposite to the lid movement direction in the box 10, and the slide member 33 is allowed to perform stroke along the vehicle-body back surface in a state in which the slide member 33 is provided in the storage space 13 of the box 10 formed in such a size that the closed position and the opened position of the lid 20 are kept therein. Thus, with the vehicle lid device 1, the device dimensions are prevented from being increased for ensuring stroke of the slide member 33, and the mechanism for opening/closing the lid 20 is downsized.

For performing opening/closing operation of the lid 20, the gear structure for meshing the gear shaft 32 and the slide member 33 with each other may be configured as a rack-and-pinion type. Thus, with the vehicle lid device 1, the number of components is decreased as compared to the wire-type worm gear structure.

During opening operation of the lid 20 from the closed position, there is a timing at which the lid 20 moves to the vehicle-body front side relative to the box 10 so as to be pushed up. When the lid 20 is pushed up, a compressive force is applied to the gasket 24 so as to press the gasket 24 to the opposed part of the vehicle-body back surface of the cover portion 12 of the box 10 and elastically deform the gasket 24. In a state in which the gasket 24 is frozen and fixed at the closed position of the lid 20, when the compressive force is applied to the gasket 24, displacement at the ice-adhesion interface between the gasket 24 and the ice becomes likely to occur. Thus, separation of the ice from the gasket 24 frozen and fixed at the closed position of the lid 20 is promoted.

At the closed position of the lid 20, the lid 20 closes the opening 14 so as to be flush with the vehicle-body surface portion 2. On the other hand, when the lid 20 is pushed up as described above, the lid 20 protrudes to the vehicle-body outside from the vehicle-body surface portion 2. In a state in which an area around the boundary between the lid 20 and the vehicle-body surface portion 2 is covered with ice at the closed position of the lid 20, when the lid 20 protrudes to the vehicle-body outside from the vehicle-body surface portion 2, the ice around the boundary becomes likely to crack. Thus, separation of the ice from the vehicle-body front surface side of the lid 20 frozen at the closed position of the lid 20 is promoted.

Accordingly, with the vehicle lid device 1, during the opening operation of the lid 20 from the closed position, the lid 20 is once pushed up to the vehicle-body front side relative to the box 10, whereby, even if the gasket 24 or the lid 20 is frozen, separation of the ice is promoted and thus opening operation of the lid 20 is smoothly performed.

In the above embodiment, the first support projection 42 of the first guide mechanism 40 and the second support projection 52 of the second guide mechanism 50 are an identical shaft member and are the support pin 23 provided to the lid 20. However, the present invention is not limited thereto. The first support projection 42 and the second support projection 52 may be different shaft members and may be provided at different locations of the lid 20.

In the above embodiment, the first support projection 42 of the first guide mechanism 40 is fixed to the lid 20, and the first guide hole portion 43 is provided to the slide member 33 and the box 10. However, the present invention is not limited thereto. The first support projection 42 may be fixed to the slide member 33, and the first guide hole portion 43 may be provided to the lid 20 and the box 10.

In the above embodiment, the second support projection 52 of the second guide mechanism 50 is fixed to the lid 20 and the second guide hole portion 53 is provided to the box 10. However, the present invention is not limited thereto. The second support projection 52 may be fixed to the slide member 33 and the second guide hole portion 53 may be provided to the box 10, or the second support projection 52 may be fixed to the box 10 and the second guide hole portion 53 may be provided to the lid 20 or the slide member 33.

In the above embodiment, the front-back-direction region portion 43d of the first guide hole portion 43 and the slide region portion 53a of the second guide hole portion 53 are provided contiguously to each other at the box 10. However, the present invention is not limited thereto. The front-back-direction region portion 43d of the first guide hole portion 43 and the slide region portion 53a of the second guide hole portion 53 may not be provided contiguously to each other at the box 10 and may be provided separately from each other.

In the above embodiment, the open/close mechanism 30 has a pair of the slide members 33 located with the opening 14 sandwiched therebetween, and the lid 20 is opened/closed through sliding of the pair of the slide members 33. However, the present invention is not limited thereto. The open/close mechanism 30 may have one slide member 33, and the lid 20 is opened/closed through sliding of the one slide member 33.

In the above embodiment, during opening operation from the closed position to the opened position, the lid 20 moves upward along the vehicle-body back surface, on the vehicle-body deep side relative to the opening 14. However, the present invention is not limited thereto. During opening operation, the lid 20 may move downward, leftward, or rightward along the vehicle-body back surface, on the vehicle-body deep side relative to the opening 14.

In the above embodiment, the vehicle-body surface portion 2 faces toward a vehicle-body lateral side (mainly, horizontal direction), and the vehicle-body opening 2a and the opening 14 penetrate in the inner-outer direction toward the vehicle-body lateral side. However, the present invention is not limited thereto. The vehicle-body surface portion 2 may face toward a vehicle-body upward side or a vehicle-body oblique upward side, and the vehicle-body opening 2a and the opening 14 may penetrate in the up-down direction or an oblique inner-outer direction.

The present invention is not limited to the embodiments and the modifications described above, and various changes may be made without departing from the gist of the present invention.

The description of the present invention discloses not only technical features shown by the reference relationship of the claims at the time of filing of the present application but also technical features obtained by combining matters described in the claims as appropriate.

This application claims priority on Japanese Patent Application No. 2022-086462 filed in Japan on May 26, 2022, the entire contents of which are incorporated herein by reference.

The invention claimed is:

1. A vehicle lid device comprising:
a box provided on a vehicle-body deep side and having an opening that allows a storage space to be exposed to a vehicle-body outside;
a lid configured to open/close between a closed position where the opening is closed and an opened position where the opening is opened; and
an open/close mechanism configured to cause the lid to open/close between the closed position and the opened position by moving the lid relative to the box, wherein the open/close mechanism includes
a rotary gear configured to rotate about a rotation axis extending along a vehicle-body back surface on the vehicle-body deep side,
a slide member provided on the vehicle-body deep side, meshed with the rotary gear, and configured to slide along the vehicle-body back surface through rotation of the rotary gear,
a first guide mechanism configured to move the lid in a vehicle-body front-back direction relative to the box by the slide member sliding in a first region section, and
a second guide mechanism configured to move the lid in a direction along the vehicle-body back surface relative to the box by the slide member sliding in a second region section contiguous to the first region section.

2. The vehicle lid device according to claim 1, wherein the first guide mechanism includes
an engagement restriction portion configured to restrict the lid from moving in a slide direction of the slide member relative to the box, by engaging the box and the lid with each other, during sliding of the slide member in the first region section,
a first support projection fixed to the lid or the slide member, and
a first guide hole portion configured to guide the first support projection so that the lid moves in the vehicle-body front-back direction relative to the box during sliding of the slide member in the first region section, and
the second guide mechanism includes
an integration portion configured to move the lid in the slide direction of the slide member, with the lid and the slide member integrated, during sliding of the slide member in the second region section,
a second support projection fixed to the box, the lid, or the slide member, and
a second guide hole portion configured to guide the second support projection so that the lid moves in the slide direction of the slide member relative to the box during sliding of the slide member in the second region section.

3. The vehicle lid device according to claim 2, wherein
the first guide hole portion includes a slope region portion extending in a direction sloped relative to the slide direction of the slide member, and
the second guide hole portion includes a slide region portion extending in the slide direction of the slide member.

4. The vehicle lid device according to claim 3, wherein
the first support projection and the second support projection are an identical shaft member provided to the lid,
the slope region portion is provided to the slide member,
the slide region portion is provided to the box,
the first guide hole portion includes a front-back-direction region portion provided contiguously to the slide region portion at the box and extending in the vehicle-body front-back direction, and
the engagement restriction portion is formed by the shaft member and a periphery of the front-back-direction region portion of the box.

5. The vehicle lid device according to claim 3, wherein
the first support projection and the second support projection are an identical shaft member provided to the lid,
the slope region portion is provided to the slide member,
the slide region portion is provided to the box,
the integration portion is formed by the shaft member, a terminal part of the slope region portion of the slide member, and a periphery of the slide region portion of the box, and
the terminal part of the slope region portion of the slide member and the periphery of the slide region portion of the box are formed so that the shaft member is guided in the slide direction of the slide member during sliding of the slide member in the second region section.

6. The vehicle lid device according to claim 3, further comprising a gasket interposed between an outer periphery of the lid and an opposed part of the box opposed to the outer periphery in the vehicle-body front-back direction at the closed position of the lid, wherein
the first guide hole portion includes a protrusion-shaped movement region portion provided contiguously to the slope region portion, and
the protrusion-shaped movement region portion is formed so that, during opening operation of the lid from the closed position, a compressive force is applied to the gasket so as to press the gasket to the opposed part and elastically deform the gasket.

7. The vehicle lid device according to claim 6, wherein
the protrusion-shaped movement region portion is formed so that, during opening operation of the lid from the closed position, the lid protrudes to the vehicle-body outside from a vehicle-body front surface.

\* \* \* \* \*